N. M. JOHNSON.
ARTIFICIAL FREEZER.
No. 3,254. Patented Sept. 9, 1843.
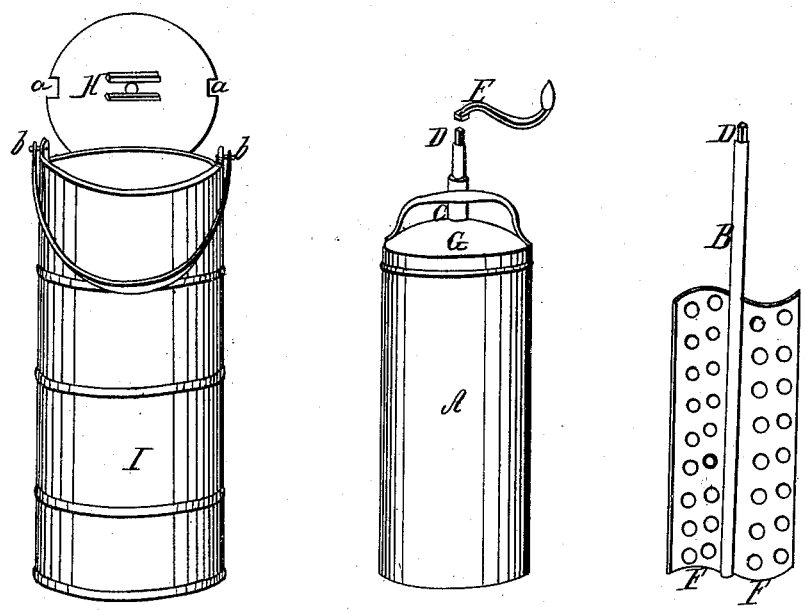

UNITED STATES PATENT OFFICE.

NANCY M. JOHNSON, OF PHILADELPHIA, PENNSYLVANIA.

ARTIFICIAL FREEZER.

Specification of Letters Patent No. 3,254, dated September 9, 1843; Antedated July 29, 1843.

*To all whom it may concern:*

Be it known that I, NANCY M. JOHNSON, of the city of Philadelphia and State of Pennsylvania, have invented a new and useful Improvement in the Art of Producing Artificial Ices, and that the following is a full and exact description of the machinery for carrying into effect the said improvement.

Instead of causing the freezer or vessel A (see the accompanying drawing) which contains the substance to be frozen to revolve as heretofore has been practiced, within the ice and salt mixture, by the hands of the operator, I place within it a vertical shaft or axis B, reaching to the bottom and coming up a short distance above the cover of the freezer, through which it passes in a tube C, traversing centrally, the lid and its handle, which tube thus becomes the upper support of the said shaft or axis—the top of this shaft or axis is terminated by a square shank D, on which after the lid is placed over it a crank E having a wooden or other nonconducting handle can be placed to give motion to the shaft.

On the shaft below the lid of the freezer are two or more wings F, F, extending to the bottom and reaching horizontally nearly to the sides of the same, these wings are generally perforated with a number of holes about half an inch or more in diameter; when but two wings are used they form together a curved figure by their horizontal cross section resembling the letter S reversed, thus ??, so that when the revolutions are made by carrying the hand from right to left between the axis and the operator, the vertical edges of the beater tend constantly to carry the liquid or semi-fluid mass from the center to the circumference of the containing cylinder or freezer and that on the contrary when he turns the crank from left to right between himself and the shaft, it will tend to cut off any frozen matter from the inner surface of the freezer and to gather it toward the central parts, thus constantly allowing fresh portions of the cream or other substances to be frozen to come in contact with the refrigerating surface.

To confine the freezer itself and prevent its revolving with the beater when the materials within it become stiff, the handle on the lid G is embraced in a groove or cavity H formed in the under side of the cover which is placed over the wooden tub or box I, within which the freezing is conducted. This cover is itself prevented from turning by notches $a$, $a$ which take hold of the two ears, $b$, $b$, of the tub, the tub being thus covered, the salt and ice as well as the freezer and its contents are defended from the heat of the air and of the person of the operator.

The lower end of the shaft of the beater is generally formed into a rounded pivot resting in a corresponding cavity in the bottom of the freezer.

I do not confine myself to any particular material in the construction of the freezer or beater for lemon, orange and other juices containing acid which might react slightly upon tinned iron, I prefer glass cylinders for freezers and hard wood or ivory for the wings of my beater, for cream and other substances which are not acid in their properties, the thickest of tinned iron is the most suitable material of which to form the beater.

When the substance to be frozen is placed in a freezer formed of two concentric cylinders and having ice and salt in a central cylinder the beaters may be attached to horizontal arms on the main vertical axis and go down on opposite sides of the central refrigerating cylinder.

In seasons and at places where the economy of ice and salt is important, I make use of a tub or box whose diameter exceeds that of the freezer only by three or four inches and by closely wrapping this in several folds of thick woolen blanket, or blanket padded with wool, fur or some similar material having a low conducting power for heat, I am enabled so to defend the contents of the same from the action of external heat as greatly to diminish the quantity of these materials necessary to produce and maintain the low temperature required for congelation.

When the economy of salt is particularly important, I effect it by evaporating the salt water derived from the salt and ice, thus making a very limited quantity of salt serve for an indefinite number of successive operations.

What I claim as new in this my invention and for which I desire to obtain Letters Patent is—

The above described revolving curved beater with its vertical axis, in combination with a freezing apparatus as above described and adapted to the purpose herein set forth.

NANCY M. JOHNSON.

In the presence of—
  JOHN THOMPSON,
  SAMUEL DAY.